(12) United States Patent
Mironets et al.

(10) Patent No.: US 12,138,708 B2
(45) Date of Patent: Nov. 12, 2024

(54) METHODS, SYSTEMS, AND APPARATUS FOR COMPONENT MANUFACTURING

(71) Applicant: GOODRICH CORPORATION, Charlotte, NC (US)

(72) Inventors: Sergey Mironets, Charlotte, NC (US); Tahany Ibrahim El-Wardany, Vernon, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 218 days.

(21) Appl. No.: 17/678,869

(22) Filed: Feb. 23, 2022

(65) Prior Publication Data

US 2023/0264289 A1 Aug. 24, 2023

(51) Int. Cl.
*B23K 20/00* (2006.01)
*B23K 20/12* (2006.01)
*B23K 101/00* (2006.01)
*B23K 103/14* (2006.01)
*B33Y 10/00* (2015.01)
(Continued)

(52) U.S. Cl.
CPC ........ *B23K 20/1215* (2013.01); *B23K 20/125* (2013.01); *B23K 20/126* (2013.01); *B23K 2101/006* (2018.08); *B23K 2103/14* (2018.08); *B33Y 10/00* (2014.12); *B33Y 30/00* (2014.12); *B33Y 80/00* (2014.12)

(58) Field of Classification Search
CPC ............. B23K 20/1215; B23K 20/125; B23K 20/126; B23K 2101/006; B23K 2103/14; B23K 2103/24; B23K 20/122–128; B33Y 10/00; B33Y 30/00; B33Y 80/00; B21C 23/002; B21C 23/085; B21C 23/217; B22F 2999/00; B22F 10/25; B22F 12/37; B22F 12/53; B22F 12/60; B22F 3/20; Y02P 10/25; B23P 15/00
USPC .............................. 228/112.1–114.5, 2.1–2.3
See application file for complete search history.

(56) References Cited

U.S. PATENT DOCUMENTS 8,066,174 B2 * 11/2011 Bruck .................. B23K 20/128
228/2.1
10,688,588 B2 6/2020 Twelves, Jr. et al.
(Continued)

FOREIGN PATENT DOCUMENTS

CN 109202271 A * 1/2019 ......... B23K 20/1215
CN 112427649 A * 3/2021 .............. B21J 5/002
(Continued)

OTHER PUBLICATIONS

European Patent Office, European Search Report dated Jul. 10, 2023 in Application No. 23156857.7.

*Primary Examiner* — Kiley S Stoner
(74) *Attorney, Agent, or Firm* — SNELL & WILMER L.L.P.

(57) ABSTRACT

Methods, systems, and apparatuses for component manufacturing are provided. A component may be manufactured via an extrusion of loose substrate material into a unitary tubing. Features may be added to the tubing via friction stir additive manufacturing to manufacture a component. In this manner, a component may be manufactured from titanium alloys while processing challenges such as iron segregation or material loss through machining are ameliorated. Such a component may replace steel or other high strength components and further exhibits corrosion resistance.

18 Claims, 4 Drawing Sheets

(51) Int. Cl.
*B33Y 30/00* (2015.01)
*B33Y 80/00* (2015.01)

(56) References Cited

U.S. PATENT DOCUMENTS

| | | | | |
|---|---|---|---|---|
| 11,772,188 B1* | 10/2023 | Sargent | B33Y 30/00 228/112.1 |
| 2014/0283574 A1* | 9/2014 | Lavender | B21C 23/002 72/262 |
| 2015/0075242 A1* | 3/2015 | Eller | B21C 25/02 72/283 |
| 2017/0056947 A1* | 3/2017 | Lavender | B21C 23/002 |
| 2018/0169485 A1* | 6/2018 | Henrikson | A63B 53/0466 |
| 2018/0311713 A1* | 11/2018 | Joshi | B21C 23/08 |
| 2018/0354058 A1* | 12/2018 | Twelves, Jr. | B23K 20/1215 |
| 2020/0009626 A1* | 1/2020 | Whalen | B21C 23/002 |
| 2020/0047248 A1* | 2/2020 | Panza-Giosa | B33Y 80/00 |
| 2020/0189000 A1* | 6/2020 | LaTour | B22F 10/73 |
| 2020/0189025 A1* | 6/2020 | Rodriguez | B23K 20/122 |
| 2020/0238379 A1* | 7/2020 | Hayes | B32B 15/01 |
| 2021/0046579 A1* | 2/2021 | Rodriguez | B33Y 30/00 |
| 2021/0053100 A1* | 2/2021 | Whalen | B21C 23/001 |
| 2021/0146471 A1* | 5/2021 | Rodriguez | B23K 20/128 |
| 2021/0197241 A1* | 7/2021 | Grant | B23K 20/1255 |
| 2021/0199383 A1* | 7/2021 | Armstrong | F28D 7/1669 |
| 2021/0205916 A1* | 7/2021 | Senderos | B33Y 80/00 |
| 2021/0252632 A1* | 8/2021 | Eller | B21C 25/02 |
| 2021/0316350 A1* | 10/2021 | Joshi | B21C 23/002 |
| 2021/0379638 A1* | 12/2021 | Whalen | B21C 23/218 |
| 2021/0402471 A1* | 12/2021 | Whalen | B21C 23/205 |
| 2021/0405471 A1 | 12/2021 | Whalen et al. | |
| 2022/0152677 A1* | 5/2022 | Whalen | B21C 23/002 |
| 2022/0297174 A1* | 9/2022 | Whalen | B21C 23/04 |
| 2022/0371067 A1* | 11/2022 | Whalen | B21C 25/04 |
| 2023/0078467 A1* | 3/2023 | Komarasamy | B21C 26/00 72/255 |
| 2023/0081786 A1* | 3/2023 | Joshi | B21C 23/218 72/262 |
| 2023/0146110 A1* | 5/2023 | Allison | B33Y 30/00 228/112.1 |
| 2023/0150022 A1* | 5/2023 | Whalen | B21C 23/085 419/67 |
| 2023/0150027 A1* | 5/2023 | Haynes | B33Y 40/20 419/42 |
| 2023/0150052 A1* | 5/2023 | Haynes | B23K 35/325 228/112.1 |
| 2023/0234115 A1* | 7/2023 | Kappagantula | B21C 23/22 72/253.1 |
| 2023/0278099 A1* | 9/2023 | Haynes | C22C 1/0458 |

FOREIGN PATENT DOCUMENTS

| | | | | |
|---|---|---|---|---|
| CN | 113857643 A | * | 12/2021 | |
| CN | 114393292 A | * | 4/2022 | |
| DE | 102019114403 | | 12/2020 | |
| EP | 3848144 | | 7/2021 | |
| WO | WO-2019089764 A1 | * | 5/2019 | B22F 10/00 |
| WO | 2020032964 | | 2/2020 | |
| WO | WO-2021062415 A1 | * | 4/2021 | B21C 23/001 |
| WO | WO-2022231423 A1 | * | 11/2022 | |

* cited by examiner

METHODS, SYSTEMS, AND APPARATUS FOR COMPONENT MANUFACTURING

FIELD

The present disclosure relates generally to component manufacturing, and more specifically to component manufacturing by additive manufacturing.

BACKGROUND

Many aircraft components, such as those found in landing gear assemblies, are conventionally made by machining steel billet material. Consequently, significant amounts of material are removed during machining, leading to significant cost and waste. Moreover, substitution of alternative materials such as titanium alloys, often leads to manufacturing challenges associated with iron segregation during material processing.

SUMMARY

In various embodiments, the present disclosure provides a method of forming an additively manufactured component. The method may include rotating a die. The method may include extending a mandrel toward the die and through a sleeve while the die is rotating. The method may further include compressing a first loose substrate material disposed within the sleeve against the rotating die by the extending mandrel. A unitary tubing may be extruded. The unitary tubing may be made of the first loose substrate material from the rotating die in response to the compressing. In various embodiments, the extruded unitary tubing comprises a first body of the additively manufactured component.

The method may contemplate rotating a first billet material. A tip of the first billet material may be pressed against the first body while the first billet material is rotating. At least a portion of the first billet material may be bonded to the first body in response to the pressing and the rotating of the first billet material. The first billet material may be translated relative to the first body and a boss may be formed from the at least the portion of the first billet material on the first body in response to the translating.

In various instances, the additively manufactured component is a metal. The additively manufactured component may be a high strength titanium alloy. The additively manufactured component may be a Ti-8V-5Fe-1Al (Ti185) metastable β-titanium alloy. The first billet material may be a ⅜ inch (0.95 cm) diameter rod. The first body and the boss may be of a same material. Moreover, the additively manufactured component may be an aircraft landing gear component.

In various embodiments, the first loose substrate material comprises an elemental mixture of titanium hydride ($TiH_2$) powder, iron, and a V—Al master alloy. The first body and the boss may exhibit homogeneous grains.

An apparatus is provided for forming an additively manufactured component. The apparatus may include a rotatable die. The apparatus may include a mandrel extendible toward the die while the die is rotating. In various instances, the apparatus includes a sleeve defining a space through which the mandrel extends, wherein the mandrel compresses a first loose substrate material disposed within the sleeve against the rotating die by the extending mandrel. A unitary tubing made of the first loose substrate material is extruded from the rotating die in response to the compressing, wherein the extruded unitary tubing comprises a first body of the additively manufactured component.

In various embodiments, the apparatus includes a friction stir additive manufacturing machine configured to rotate and press a first billet material against the first body while the first billet material is rotating and to bond at least a portion of the first billet material to the first body in response to the pressing and the rotating of the first billet material. The friction stir additive manufacturing machine translates the first billet material relative to the first body, wherein a boss formed from the at least the portion of the first billet material is additively manufactured on the first body in response to the translating.

The additively manufactured component may be a metal. The additively manufactured component may be a high-strength titanium alloy. The additively manufactured component may be a Ti-8V-5Fe-1Al (Ti185) metastable β-titanium alloy. The first billet material may be a ⅜ inch (0.95 cm) diameter rod. The first body and the boss may be of a same material. The additively manufactured component may be an aircraft landing gear component. The first loose substrate material may be an elemental mixture of titanium hydride ($TiH_2$) powder, iron, and a V—Al master alloy.

A method of forming an additively manufactured component is provided. The additively manufactured component may be an extruded unitary tubing, the method may include rotating a die. The method may include extending a mandrel toward the die and through a sleeve while the die is rotating and compressing a first loose substrate material disposed within the sleeve against the rotating die by the extending mandrel. The method may include extruding the unitary tubing made of the first loose substrate material from the rotating die in response to the compressing. The extruded unitary tubing may be a component of an aircraft landing gear.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
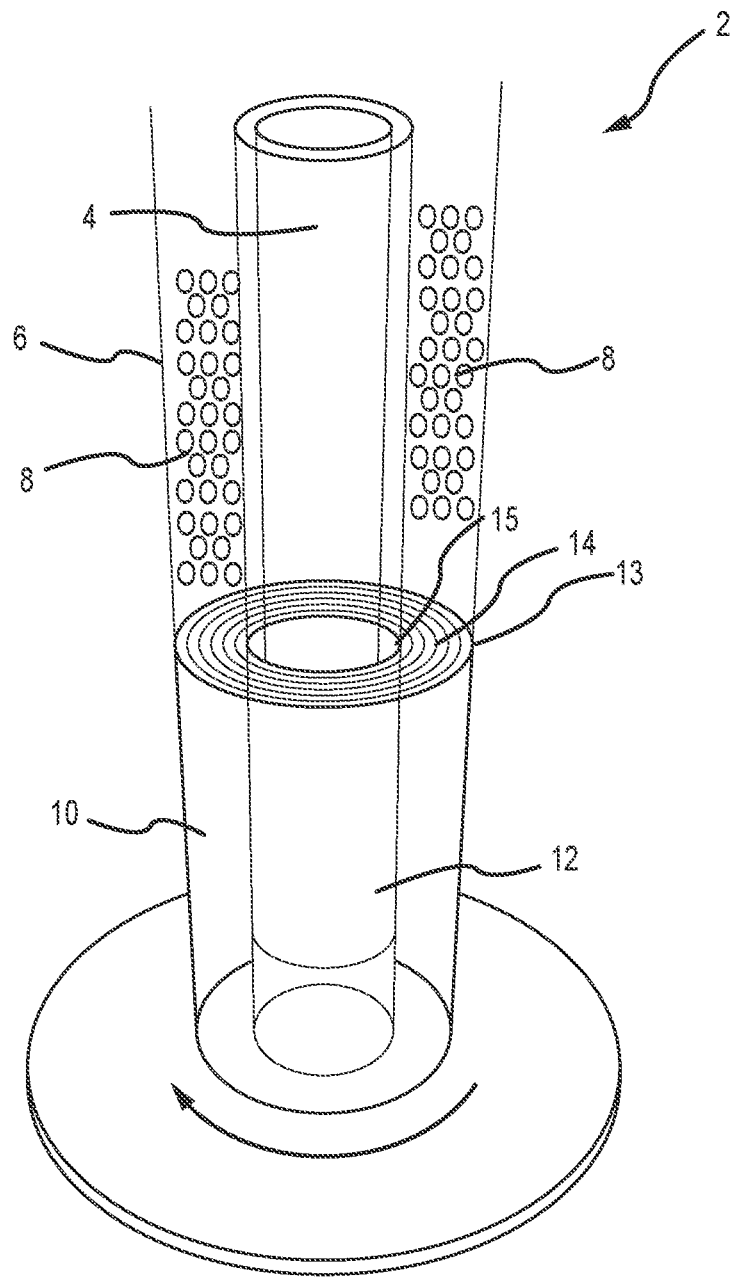
FIG. 1 is a cross-sectional view of a manufacturing assembly configured to extrude an extruded tubing for use in an additively manufactured component, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. Throughout the present disclosure, like reference numbers denote like elements.

The present disclosure describes additively manufactured components. In various embodiments, the additively manufactured components may be aspects of an aircraft landing gear assembly. For instance, prior aircraft landing gear assemblies may be manufactured by machining large pieces of billet material to remove unwanted material and leave a machined part having a desired shape. However, significant material waste results from machining. Moreover, prior aircraft landing gear assemblies may be manufactured from a dense material such as steel. In various instances, lighter materials may be advantageous, however, many lighter materials exhibit inadequate strength, such as due to variations in microstructures arising from manufacturing processes.

In various embodiments, methods are provided for additive manufacturing of components with both ameliorated material waste and also with sufficient strength for utilization in assemblies such as landing gear assemblies.

For example, Ti-185 (Ti-8V-5FE-1A1) alloys may replace steel alloys. While conventional production metallurgical techniques are challenging due to iron segregation resulting in the formation of inhomogeneous β structures detrimental to desired mechanical properties, systems and methods provided herein achieve, in various embodiments, improved grain size such as smaller grain size and improved grain morphology, such as consistency among grains and reduced constituent segregation. Systems and methods provided herein are associated with improved strength. For example, addition of iron (Fe) in excess of about 2.5 weight percent (wt. %) in a titanium alloy would conventionally lead to iron segregation and formation of inhomogeneous β structures known as β flecks, which is detrimental to the mechanical performance of the alloy.

Generally, a shear assisted processing and extrusion (SHAPE) technology is provided to produce a tubular preform and friction stir additive manufacturing (F SAM) technology is provided to add features onto the preform to produce a near net shape component. Both SHAPE and F SAM technologies produce fine equiaxed grains such that homogeneous fine-grained microstructures achieve excellent strength and reduced manufacturing cost and weight. Moreover, implementation of titanium alloys improves anti-corrosion properties of manufactured parts relative to steel components and reduces weight, improving vehicle fuel consumption.

With reference to FIG. 1, a manufacturing assembly 2 is depicted. The manufacturing assembly 2 is configured to extrude an extruded tubing for use in an additively manufactured component. For example, the manufacturing assembly 2 may include a mandrel 4. The mandrel 4 may be a shaft extendible through a sleeve 6 toward a die 10. For instance, the mandrel 4 may be a cylindrical shaft. In further embodiments, the mandrel 4 may be a shaft having different shapes, as desired. In various instances, a cross-section of the mandrel 4 corresponds to an inner cross-sectional shape of the extruded tubing.

The manufacturing assembly may include the sleeve 6. The sleeve 6 may be a cylindrical tubing having inner dimensions (e.g., diameter) larger than outer dimensions (e.g., diameter) of the mandrel 4 so as to define a space, such as an annulus, adjacent to the mandrel 4. The sleeve 6 may receive a first loose substrate material 8 into the space, which is formed into an extruded tubing.

The manufacturing assembly may include a die 10. A die 10 may comprise a series of spiral grooves 14 in a face 13. The face 13 may have an aperture 15 defined through the face 13. Thus, the face 13 may comprise an annulus with a series of spiral grooves 14. The face 13 may define an annulus having an aperture 15 through which the mandrel 4 may pass. Accordingly, the aperture 15 may provide a gap between the mandrel 4 and the face 13 through which an extrusion is formed. For instance, a unitary tubing 12 may be formed of the first loose substrate material 8 within the sleeve 6 as the mandrel 4 compresses the loose substrate material against the die 10.

Figure 3:
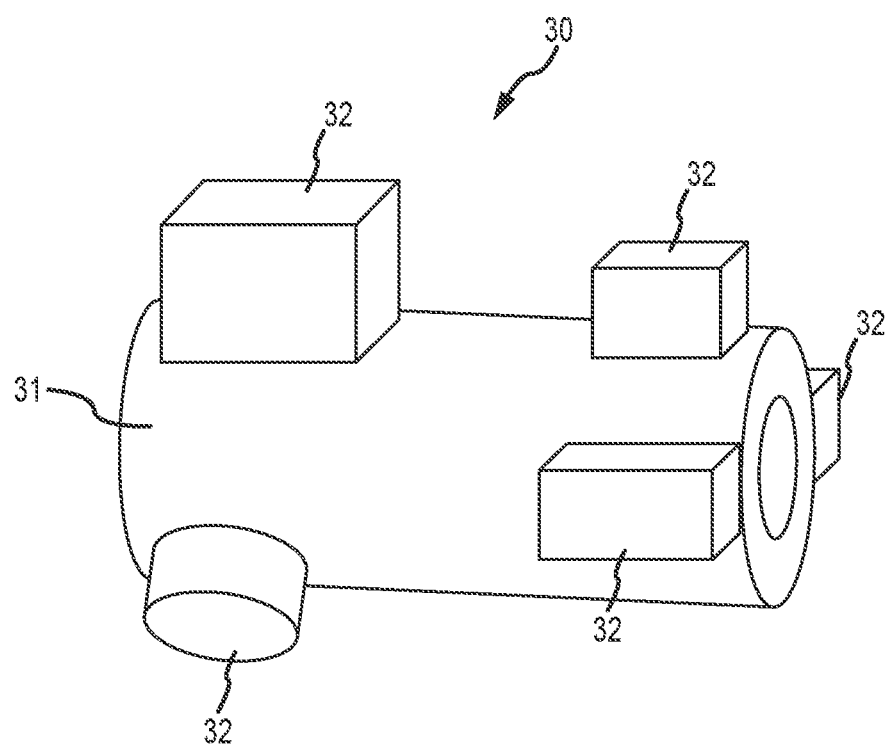
FIG. 3 depicts various examples of bosses of different sizes and shapes formed on the extruded tubing by friction stir additive manufacturing, in accordance with various embodiments.

Consequently, the die 10 may be rotated and the mandrel 4 extended through the sleeve 6 while the die 10 is rotating. A space is defined between the mandrel 4 and the sleeve 6 and the first loose substrate material 8 may be introduced into the space. The set of spiral grooves 14 may be defined on the face 13 of the die 10 toward the mandrel 4. As the mandrel 4 extends toward the die 10 and through an aperture 15 of the face 13 of the die 10, the first loose substrate material 8 may be compressed against the rotating die 10 by the extending mandrel 4. In response to the compressing, a unitary tubing 12 made of the first loose substrate material 8 may be extruded. This extruded unitary tubing 12 may be a first body 31 of an additively manufactured component (e.g., unitary tubing 12 of component 30 (FIG. 3).

In various embodiments, the extruded tubing is metal. For instance, the metal may be a high strength titanium alloy. In various instances, the metal is a Ti-8V-5Fe-1A1 (Ti185) metastable β-titanium alloy. Thus, one may appreciate that the first loose substrate material 8 may comprise similar materials. For instance, the first loose substrate material 8 may comprise an elemental mixture of titanium hydride ($TiH_2$) powder, iron, and a V—Al master alloy.

Figure 2:
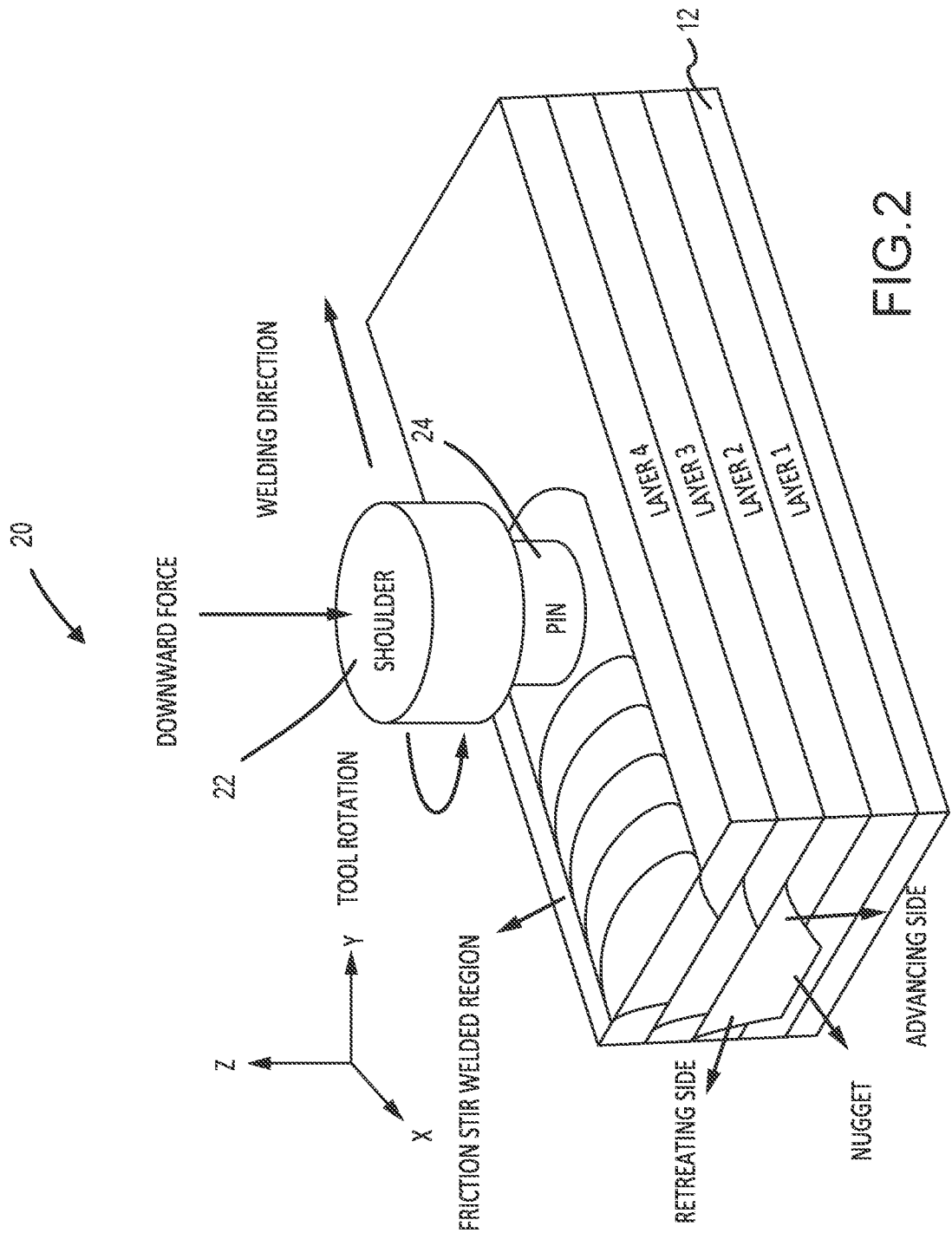
FIG. 2 is a view of a friction stir additive manufacturing scenario by which bosses and other features may be added to the extruded tubing of the additively manufactured component, in accordance with various embodiments.

Directing attention now to FIG. 2, a friction stir additive manufacturing embodiment is provided wherein a friction stir additive manufacturing machine adds bosses or other elements to a unitary tubing. Bosses or other additively manufactured elements are frequently desired to be added to a unitary tubing 12 (FIG. 1), such as to create more complex structures.

For instance, a first billet material 22 having a tip 24 may be rotated. The tip 24 of the first billet material 22 may be pressed against the unitary tubing 12 causing at least a portion of the first billet material 22 to be liberated from the tip 24 and bonded to the unitary tubing 12. In various instances, the first billet material 22 is pressed against the unitary tubing 12 while the first billet material 22 is rotating, causing plasticization and heating, as the first billet material 22 flows and unites with the unitary tubing 12 as a homogeneous, monolithic structure. The first billet material 22 may comprise a same material as the unitary tubing 12. As such, at least a portion of the first billet material 22 may bond to the unitary tubing 12 forming a layer. The first billet material 22 may be translated relative to the unitary tubing 12. As material is liberated from the tip 24 and bonds to the unitary tubing 12 forming a layer, a boss may be formed from the at least the portion of the first billet material 22 on the unitary tubing 12 in response to the translating. Multiple layers may be formed by repeating the translating and rotating aspects until sufficient layers are bonded to create a boss of a desired size and shape. In various embodiments, the first billet material may be a rod with an end of the rod being the tip 24. For example, the first billet material may comprise a ⅜ inch (0.95 cm) rod, though other configurations are contemplated.

Examples of bosses of desired sizes and shapes formed by friction stir additive manufacturing on a unitary tubing are depicted in FIG. 3. For instance, a unitary tubing 12 may form a first body 31 of an additively manufactured component 30 and may have bosses 32 arranged thereon and integrated therewith into a homogeneous unitary structure. The homogeneous unitary structure may be a component of an aircraft landing gear.

Figure 4:
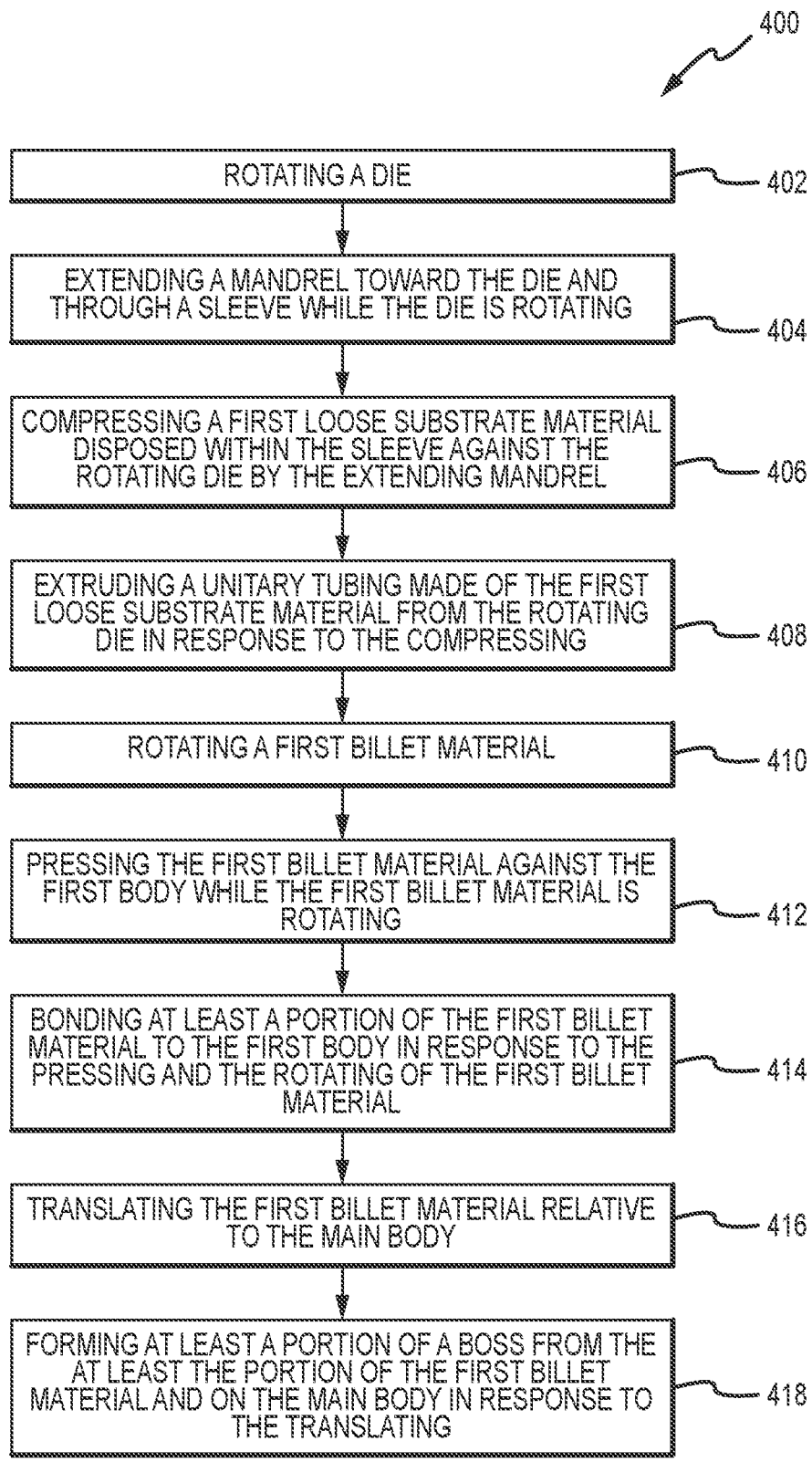
FIG. 4 is a process diagram illustrating a method of forming the additively manufactured component, in accordance with various embodiments.

Turning now to FIG. 4, a method of forming an additively manufactured component 400 consistent with the disclosure herein, is provided. The method may include rotating a die (block 402). The method may include extending a mandrel toward the die and through a sleeve while the die is rotating (block 404). Moreover, the method may include compressing a first loose substrate material disposed within the sleeve against the rotating die by the extending mandrel (block 406). This results in extruding a unitary tubing made of the first loose substrate material from the rotating die in response to the compressing, wherein the extruded unitary tubing comprises a first body of the additively manufactured component (block 408).

In various embodiments, the method also includes aspects of friction stir additive manufacturing. For instance, the method may include rotating a first billet material (block 410) and pressing a tip of the first billet material against the first body while the first billet material is rotating (block 412). The method may include bonding at least a portion of the first billet material to the first body in response to the pressing and the rotating of the first billet material (block 414). Furthermore, the method may include translating the first billet material relative to the first body (block 416) and forming a boss from the at least the portion of the first billet material on the first body in response to the translating (block 418).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A method of forming an additively manufactured component comprising:
   rotating a die;
   extending a mandrel through a sleeve and toward the rotating die while the die is rotating;
   compressing, by the mandrel, a first loose substrate material disposed within the sleeve against the rotating die;

extruding a unitary tubing made of the first loose substrate material from the rotating die in response to the compressing, by the mandrel, the first loose substrate material disposed within the sleeve against the rotating die, wherein the extruded unitary tubing comprises a first body of the additively manufactured component;

rotating a first billet material;

pressing a tip of the first billet material against the first body while the first billet material is rotating;

bonding at least a portion of the first billet material to the first body in response to the pressing and the rotating of the first billet material;

translating the first billet material relative to the first body; and forming a boss from the at least the portion of the first billet material on the first body in response to the translating.

2. The method according to claim 1, wherein the additively manufactured component is a metal.

3. The method according to claim 1, wherein the additively manufactured component is a titanium alloy.

4. The method according to claim 1, wherein the additively manufactured component is a Ti-8V-5Fe-1Al (Ti185) metastable β-titanium alloy.

5. The method according to claim 1, wherein the first billet material comprises a ⅜ inch (0.95 cm) diameter rod.

6. The method according to claim 1, wherein the first body and the boss are of a same material.

7. The method according to claim 1, wherein the additively manufactured component comprises an aircraft landing gear component.

8. The method according to claim 1, wherein the first loose substrate material comprises an elemental mixture of titanium hydride (TiH2) powder, iron, and a V—Al master alloy.

9. The method according to claim 1, wherein the first body and the boss exhibit homogeneous grains.

10. An apparatus for forming an additively manufactured component comprising:

a rotatable die;

a mandrel extendible toward the rotatable die while the rotatable die is rotating;

a sleeve defining a space through which the mandrel extends, wherein the mandrel extends through the sleeve and compresses a first loose substrate material disposed within the sleeve against the rotatable die, wherein a unitary tubing made of the first loose substrate material is extruded from the rotatable die in response to the compressing, by the mandrel, the first loose substrate material disposed within the sleeve against the rotatable die, wherein the extruded unitary tubing comprises a first body of the additively manufactured component; and a friction stir additive manufacturing machine configured to rotate and press a first billet material against the first body while the first billet material is rotating and to bond at least a portion of the first billet material to the first body in response to the pressing and the rotating of the first billet material.

11. The apparatus of claim 10, wherein the friction stir additive manufacturing machine translates the first billet material relative to the first body, and wherein a boss formed from the at least the portion of the first billet material is additively manufactured on the first body in response to the translating.

12. The apparatus of claim 11, wherein the additively manufactured component is a metal.

13. The apparatus of claim 11, wherein the additively manufactured component is a titanium alloy.

14. The apparatus of claim 11, wherein the additively manufactured component is a Ti-8V-5Fe-1Al (Ti185) metastable β-titanium alloy.

15. The apparatus of claim 11, wherein the first billet material comprises a ⅜ inch (0.95 cm) diameter rod.

16. The apparatus of claim 11, wherein the first body and the boss are of a same material.

17. The apparatus of claim 11, wherein the additively manufactured component comprises an aircraft landing gear component.

18. The apparatus of claim 11, wherein the first loose substrate material comprises an elemental mixture of titanium hydride (TiH2) powder, iron, and a V—Al master alloy.

* * * * *